United States Patent
Wang et al.

(10) Patent No.: US 7,289,766 B2
(45) Date of Patent: Oct. 30, 2007

(54) SYSTEM AND METHOD TO INITIATE RELIABLE RECEPTION ON A PACKET DATA CHANNEL IN A WIRELESS COMMUNICATIONS NETWORK

(75) Inventors: Chung-Ching Wang, Plano, TX (US); Ke-Chi Jang, Plano, TX (US); Jun Li, Richardson, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 577 days.

(21) Appl. No.: 10/326,559

(22) Filed: Dec. 20, 2002

(65) Prior Publication Data

US 2003/0216123 A1 Nov. 20, 2003

Related U.S. Application Data

(60) Provisional application No. 60/380,515, filed on May 14, 2002.

(51) Int. Cl.
*H04B 1/00* (2006.01)
(52) U.S. Cl. .............. 455/63.1; 455/67.11; 455/67.13; 455/436
(58) Field of Classification Search ............ 455/67.11, 455/67.13, 436, 63.1
See application file for complete search history.

(56) References Cited

U.S. PATENT DOCUMENTS 6,633,554 B1 * 10/2003 Dalal ..................... 370/331
2001/0043578 A1 * 11/2001 Kumar et al. ............... 370/331
2002/0004397 A1 * 1/2002 Lee et al. .................. 455/442

FOREIGN PATENT DOCUMENTS

| GB | 2375691 A | 11/2002 |
|---|---|---|
| WO | WO 01/61884 A1 | 8/2001 |
| WO | WO 02/31987 A2 | 4/2002 |
| WO | WO 02/065664 | 8/2002 |
| WO | WO 02/082108 | 10/2002 |

OTHER PUBLICATIONS

3rd Generation Partnership Project 2 "3GPP2", May 13, 2002, "CDMA 2000 for C ballot comments".*
3GPP2 C.S0005-C, Upper Layer (Layer 3) Signalling Standard for cdma 2000 Spread Spectrum Systems—Release C, 3rd Generation Partnership Project 2 "3GPP2"—2002, pp. 2-177-2-211; 2-215-2-254; 2-402-2-484; 3-193-3-252; and 3-565-3-656.

* cited by examiner

*Primary Examiner*—Edward F. Urban
*Assistant Examiner*—Raymond S. Dean
(74) *Attorney, Agent, or Firm*—Haynes and Boone, LLP

(57) ABSTRACT

A system and method to initiate reliable reception on a packet data channel in a wireless communications system is described.

17 Claims, 1 Drawing Sheet

SYSTEM AND METHOD TO INITIATE RELIABLE RECEPTION ON A PACKET DATA CHANNEL IN A WIRELESS COMMUNICATIONS NETWORK

CROSS REFERENCE TO RELATED APPLICATION

This application claims the benefit of U.S. Provisional Patent Application Ser. No. 60/380,515, filed May 14, 2002.

BACKGROUND OF THE INVENTION

The following disclosure relates generally to communications systems and, more particularly, to initiate reliable reception on a packet data channel (PDCH) in a wireless communications system.

In Code Division Multiple Access (CDMA) 1xEV-DV communication systems, a Mobile Station (MS) uses a R-CQICH channel to transmit forward channel quality indicators, and uses a R-ACKCH channel to transmit an acknowledgement to the base station (BS) of the reception of a forward packet data channel. It is important for a BS to successfully receive and decode these two channels in order to efficiently schedule the transmission on the PDCH. However, from time to time, the interference on the reverse link is so strong that a reliable reception of R-CQICH and R-ACKCH cannot be ensured at the BS. In this case, the BS may direct the MS to reduce the transmission rate on R-CQICH and R-ACKCH to increase the reliability on these channels. The BS accomplishes this by setting two parameters: REV_CQICH_REPS and REV_ACKCH_REPS and communicates them to the MS via a Rate Change Message. However, if the transmission is not reliable, the parameter change may not be received by the MS.

Therefore, what is needed is a system and method for improving reliability reception by a MS in a communications system.

SUMMARY OF THE INVENTION

The system and method of the present invention includes a methodology to initiate reliable reception on a packet data channel in a wireless communications system.

Other aspects and features of the present disclosure will become apparent to those ordinarily skilled in the art upon review of the following description of specific embodiments of the disclosure in conjunction with the accompanying figure.

DETAILED DESCRIPTION OF A PREFERRED EMBODIMENT

Figure 1:
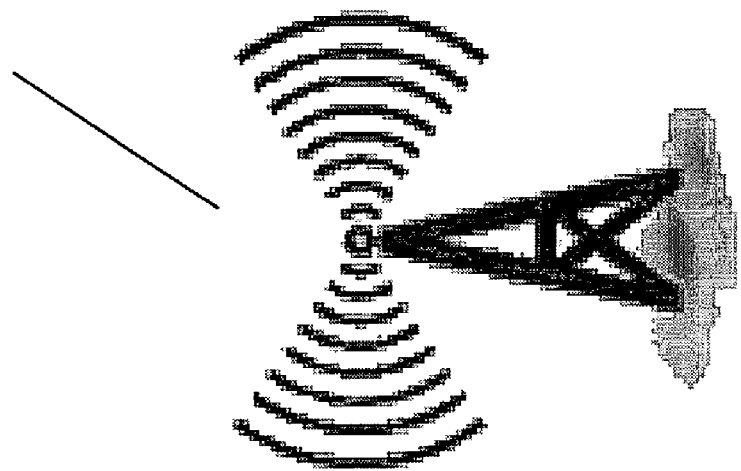
FIG. 1 is a diagram of a common mobile station and a base station.
Figure 1:
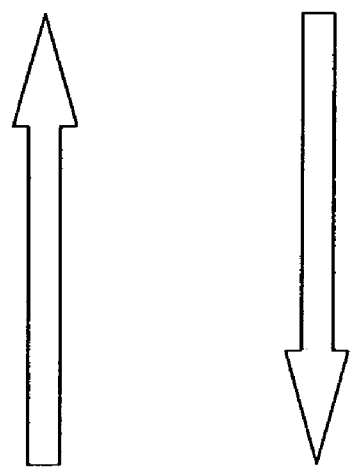
Figure 1:
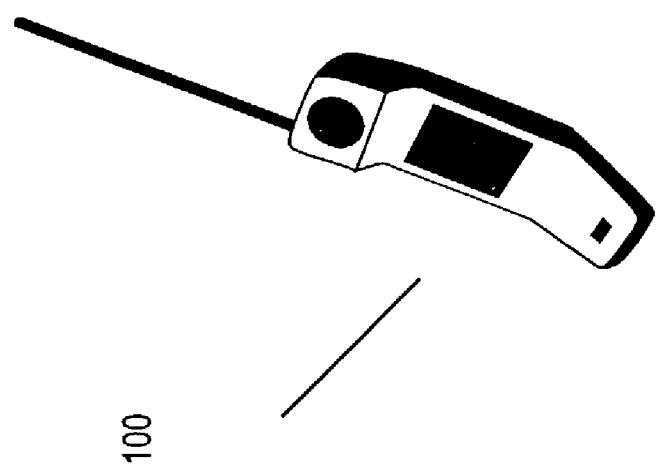

The present invention relates generally to communications systems and, more particularly, to improving reliable reception on a packet data channel (PDCH) in a wireless communications network. It is understood, however, that the present invention includes many different embodiments or examples. Specific examples are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

While the preceding description shows and describes one or more embodiments, it will be understood by those skilled in the art that various changes in form and detail may be made therein without departing from the spirit and scope of the present disclosure. Therefore, the claims should be interpreted in a broad manner, consistent with the present disclosure. Some terms now will now be defined in order to more clearly describe the present invention.

Terms

ACKCH_REPS—Indicates the number of repetitions (in terms of 1.25 MS slots) of the ACK (Acknowledgement) or NAK (Negative Acknowledgement) sent on the R-ACKCH.

BS—Base Station.

C/I—Carrier-to-Interference ratio.

CQICH_REPS—Indicates the number of repetitions (in terms of 1.25 MS frames) the full C/I update sent on the R-CQICH.

Fundicate Channel—Fundamental Channel, Dedicated Control Channel, or both.

BS—Mobile Station.

F-PDCH—Forward Packet Data Channel. A portion of a Forward Traffic Channel with Spreading Rate 1 which carries a combination of higher level data and power control information.

R-ACKCH—Reverse Acknowledgement Channel. A portion of a Reverse CDMA Channel used for the transmission of acknowledgements from the mobile station to the base station in response to the data transmitted on the Forward Packet Data Channel.

R-CQICH—Reverse Channel Quality Indicator Channel. A portion of a Reverse CDMA Channel used by the mobile station to indicate to the base station the quality of the Forward Link Pilot Channel received at the mobile station.

Using FIG. 1 as reference, a problem arises when a Mobile Station (MS) 100 has no fundicate channel and a Base Station (BS) 102 has to transmit a Rate Change Message on the PDCH. In order for the BS 102 to efficiently transmit the message on the PDCH, the BS 102 needs reliable reception of the R-CQICH and R-ACKCH channels in the first place. In addition, during handoff, the target BS 102 also needs to know the transmission rate of the R-CQICH and the R-ACKCH in order to successfully decode these two channels.

Currently, when a F-PDCH is assigned to a MS 100, the BS 102 can only assign REV_CQICH_REPS and REV_ACKCH_REPS to the MS 100 by using a Rate Change Message. But in some cases, this might be too late to assign these values to the MS 100. Also in the handoff case, there may be a need to change these values for the new BS 102. The system and method of the present invention adds these two parameters in an Extended Channel Assignment Message (ECAM) as well as in a Universal Handoff Direction Message (UHDM).

In the Page Response substate of System Access State, the MS 100 processes the ECAM message as described in the following paragraphs.

The MS 100 first sets the R-CQICH rate to the one specified by REV_CQICH_REPS when the MS 100 enters the Traffic Channel Initialization Substate of the MS 100 Control on the Traffic Channel State.

In addition, the MS 100 sets the R-ACKCH rate to the one specified by REV_ACKCH_REPS when the MS 100 enters the Traffic Channel Initialization Substate of the MS 100 Control on the Traffic Channel State.

The MS 100 then enters the Traffic Channel Initialization Substate of the MS 100 Control on the Traffic Channel State.

Now referring to the MS 100 Origination Attempt Substate, the MS 100 first sends an Origination Message. If the BS 102 responds to the Origination Message with an authentication request, the MS 100 responds in this substate. Within this substate, the MS 100 processes the ECAM message as described in the following paragraphs.

The MS 100 sets the R-CQICH rate to the one specified by REV_CQICH_REPS when the mobile station enters the Traffic Channel Initialization Substate of the Mobile Station Control on the Traffic Channel State.

The MS 100 sets the R-ACKCH rate to the one specified by REV_ACKCH_REPS when the mobile station enters the Traffic Channel Initialization Substate of the MS 100 Control on the Traffic Channel State.

The MS 100 then enters the Traffic Channel Initialization Substate of the MS 100 Control on the Traffic Channel State.

Now turning to handoffs, and specifically the Universal Handoff Direction Message, the MS 100 processes the message as is described in the following paragraphs.

If the packet data channel is selected for the handoff (e.g. CH IND='000'), the MS 100 also processes this message as described in the following paragraphs.

The MS 100 sets the R-CQICH rate to the one specified by REV_CQICH_REPS at the action time of the message.

Additionally, the MS 100 sets the R-ACKCH rate to the one specified by REV_ACKCH_REPS at the action time of the message.

The specific ECAM messages is adapted to the following when the ASSIGN_MODE='101'.

TABLE 1

| [. . .] | [. . .] |
|---|---|
| EXT_CH_IND | 5 |
| FPC_SUBCHAN_GAIN | 0 or 5 |
| REV_FCH_GATING_MODE | 0 or 1 |
| REV_PWR_CNTL_DELAY_INCL | 0 or 1 |
| REV_PWR_CNTL_DELAY | 0 or 2 |
| FULL_CI_FEEDBACK_IND | 1 |
| REV_CQICH_REPS | 2 |
| REV_ACKCH_REPS | 2 |
| FOR_PDCH_RC | 5 |
| FOR_FCH_DCCH_RC | 0 or 5 |
| [. . .] | [. . . |

In addition, the Reverse Channel Quality Indicator Channel repetition factor (REV_CQICH_REPS) is set by the BS 102 according to the Table 2 below.

Moreover, the Reverse Acknowledgement Channel repetition factor (REV_ACKCH_REPS) is set by the BS 102 according to the Table 3 below.

TABLE 2

R-CQICH_Repetition Factor

| REV_CQICH_REPS (Binary) | Value |
|---|---|
| 00 | 1 |
| 01 | 2 |
| 10 | 4 |
| 11 | Reserved |

TABLE 3

R-ACKCH Repetition Factor

| REV_ACKCH_REPS (Binary) | Value |
|---|---|
| '00' | 1 |
| '01' | 2 |
| '10' | 4 |
| '11' | Reserved |

Now referring specifically to the Universal Handoff Direction Message (UHDM), the MSG_TAG: UHDM is defined as described in the following paragraph.

If EXT_CH_IND='00001', '00010', '00011', '00100', 00101', 00110', the EXT_ACTIVE_SET_REC_FIELDS are:

TABLE 4

| PDCH_CONTROL_HOLDS | 1 |
|---|---|
| NUM_SWITCHING_FRAMES_INCL | 1 |
| NUM_SOFT_SWITCHING_FRAMES | 0 or 3 |
| NUM_SOFTER_SWITCHING_FRAMES | 0 or 3 |
| FULL_CI_FEEDBACK_IND | 1 |
| REV_CQICH_REPS | 2 |
| REV_ACKCH_REPS | 2 |
| NUM_FOR_SCH | 0 or 5 |

Further, the Reverse Channel Quality Indicator Channel repetition factor (REV_CQICH_REPS) is set by the BS 102 according to the Table 2 above.

Moreover, the Reverse Acknowledgement Channel repetition factor (REV_ACKCH_REPS) is set by the BS 102 according to the Table 3 above.

While the preceding description shows and describes one or more embodiments, it will be understood by those skilled in the art that various changes in form and detail may be made therein without departing from the spirit and scope of the present disclosure. For example, it is within the scope of the present disclosure that the BS, and/or the MS may not exist in the same fashion in other technologies or implementations, but the same functionality may be achieved using other components. Therefore, the claims should be interpreted in a broad manner, consistent with the present disclosure.

What is claimed is:

1. A method for reliable reception within a wireless communications network including a Mobile Station (MS) and a Base Station (BS), the method including:
   receiving at the MS a first message with a first parameter that indicates the number of repetitions of updating a carrier to interference ratio sent on a channel quality indicator channel from the MS to the BS during call setup; and
   setting by the MS a reverse channel quality indicator channel rate based on the first parameter prior to said MS acquiring a traffic channel so that the MS can use appropriate repetitions for the channel quality indicator channel when the MS acquires said traffic channel.

2. The method of claim 1 wherein the first message is an Extended Channel Assignment Message (ECAM).

3. The method of claim 1 wherein the first parameter is a REV_CQICH_REPS parameter.

4. The method of claim 1 further including:
   receiving at the MS the first message with a second parameter that indicates the number of repetitions of an acknowledgement message and a negative acknowledgement message sent on an acknowledgement channel from the MS to the BS during call setup; and setting by the MS a reverse acknowledgement channel rate to the one specified by the second parameter so that the MS can use appropriate repetitions for the reverse acknowledgement channel when the MS acquires the traffic channel.

5. The method of claim 4 wherein the first message is an Extended Channel Assignment Message (ECAM).

6. The method of claim 4 wherein the second parameter is a REV_ACKCH_REPS parameter.

7. A method for reliable reception within a wireless communications network including a Mobile Station (MS) and a Base Station (BS), the method including:

receiving at the MS a first message with a first parameter that indicates the number of repetitions of updating a carrier to interference ratio sent on a channel quality indicator channel from the MS to the BS during a handoff; and setting by the MS a reverse channel quality indicator channel rate based on the first parameter "prior to said MS acquiring a traffic channel" so that the MS can use appropriate repetitions for the channel quality indicator channel when the MS acquires said traffic channel.

8. The method of claim 7 wherein the message is an Universal Handoff Direction Message (UHDM).

9. The method of claim 7 wherein the first parameter is a REV_CQICH_REPS parameter.

10. The method of claim 7 further including:

receiving at the MS the first message with a second parameter that indicates the number of repetitions of an acknowledgement message and a negative acknowledgement message sent on an acknowledgement channel from the MS to the BS during the handoff; and setting by the MS a reverse acknowledgement channel rate to the one specified by the second parameter so that the MS can use appropriate repetitions for the reverse acknowledgement channel when the MS acquires the traffic channel.

11. The method of claim 10 wherein the first message is an Extended Channel Assignment Message (ECAM).

12. The method of claim 10 wherein the second parameter is a REV_ACKCH_REPS parameter.

13. A method for reliable reception within a wireless communications network including a Mobile Station (MS) and a Base Station (BS), the method including:

receiving by the MS a message with a first parameter that indicates the number of repetitions of updating a carrier to interference ratio sent on a channel quality indicator channel and a second parameter that indicates the number of repetitions of an acknowledgement message and a negative acknowledgement message sent on an acknowledgement channel, from the MS to the BS during call setup; and setting by the MS a reverse channel quality indicator channel rate based on the first parameter and a reverse acknowledgement channel rate to the one specified by the second parameter "prior to said MS acquiring a traffic channel" so that the MS can use appropriate repetitions for the channel quality indicator channel and the acknowledgement channel when the MS acquires said traffic channel.

14. The method of claim 13 wherein the message is an Universal Handoff Direction Message (UHDM).

15. The method of claim 13 wherein the first parameter is a REV_CQICH_REPS parameter.

16. The method of claim 13 wherein the message is an Extended Channel Assignment Message (ECAM).

17. The method claim 13 wherein the second parameter is a REV_ACKCH_REPS parameter.

\* \* \* \* \*